(12) United States Patent
Cao

(10) Patent No.: US 10,744,692 B2
(45) Date of Patent: Aug. 18, 2020

(54) EXTRUSION MOLDING MACHINE FOR MANUFACTURING SPIRAL BICOLOR LED HOSE LIGHT

(71) Applicant: Lin-Yu Cao, Guangdong (CN)

(72) Inventor: Lin-Yu Cao, Guangdong (CN)

( * ) Notice: Subject to any disclaimer, the term of this patent is extended or adjusted under 35 U.S.C. 154(b) by 208 days.

(21) Appl. No.: 15/865,276

(22) Filed: Jan. 9, 2018

(65) Prior Publication Data
US 2019/0210258 A1   Jul. 11, 2019

(51) Int. Cl.
| | | |
|---|---|---|
| *F21S 4/26* | (2016.01) | |
| *B29C 35/16* | (2006.01) | |
| *B29C 70/70* | (2006.01) | |
| *B29C 70/72* | (2006.01) | |
| *B29C 48/17* | (2019.01) | |
| *B29C 48/15* | (2019.01) | |
| *B29C 45/16* | (2006.01) | |
| *B29L 31/00* | (2006.01) | |

(52) U.S. Cl.
CPC ............ *B29C 45/164* (2013.01); *B29C 35/16* (2013.01); *B29C 48/15* (2019.02); *B29C 48/175* (2019.02); *B29C 70/70* (2013.01); *B29C 70/72* (2013.01); *F21S 4/26* (2016.01); *B29C 2035/1616* (2013.01); *B29K 2995/0021* (2013.01); *B29L 2031/747* (2013.01)

(58) Field of Classification Search
CPC ....... B29C 48/15; B29C 48/20; B29C 48/301; B29C 48/78; B29C 48/2665
USPC ......................................................... 425/113
See application file for complete search history.

(56) References Cited

U.S. PATENT DOCUMENTS

| | | | | | |
|---|---|---|---|---|---|
| 3,854,527 | A | * | 12/1974 | Maroschak | B29C 35/16 165/120 |
| 5,716,574 | A | * | 2/1998 | Kawasaki | B29C 48/30 264/171.17 |
| 5,855,926 | A | * | 1/1999 | Yoshida | B29C 48/30 425/133.1 |
| 7,883,328 | B2 | * | 2/2011 | Lin | H01B 13/34 425/113 |
| 2013/0334730 | A1 | * | 12/2013 | Maeder | B29C 48/30 264/176.1 |
| 2014/0170256 | A1 | * | 6/2014 | Tai | B29C 48/301 425/461 |

(Continued)

*Primary Examiner* — Robert C Dye
*Assistant Examiner* — Alexander D Booth
(74) *Attorney, Agent, or Firm* — Leong C. Lei

(57) ABSTRACT

An extrusion molding machine for manufacturing the spiral bicolor LED hose light just needs a single process and equipment to greatly increase the production efficiency and save the equipment investment costs. The input channel terminal of the second flow channel connected with a first horizontal channel is gradually smaller, and the transportation end terminal of the first horizontal channel connected with a second horizontal channel of larger diameter is gradually larger. The transportation end terminal of the second extruder is connected with the input terminal of the third flow channels. The light strip input channel inputs the LED light strip to pass through the first and second flow channel, which the transparent molten plastic squeezed by the first extruder wraps and covers the LED light strip and the molten plastic with the other color squeezed by the second extruder is spirally wounded on the surface of the transparent molten plastic.

6 Claims, 2 Drawing Sheets

(56) References Cited

U.S. PATENT DOCUMENTS

2016/0297110 A1* 10/2016 Wu .................... B29C 35/16
2017/0100870 A1* 4/2017 Rassi .................. B29C 48/362

* cited by examiner

EXTRUSION MOLDING MACHINE FOR MANUFACTURING SPIRAL BICOLOR LED HOSE LIGHT

(A) TECHNICAL FIELD OF THE INVENTION

The present invention relates to an extrusion molding machine, especially relates to an extrusion molding machine for manufacturing the spiral bicolor LED hose light.

(B) DESCRIPTION OF THE PRIOR ART

With the continuous development of electronic technology and the flexible material for LED lamps, there is now a flexible LED hose light as a light source. The LED hose light is mostly used for the holiday ornaments or for the decorative building ornaments.

This kind of lamp usually use different colors of light beads as the light source, and the light beads are usually evenly arranged on the flexible light strip with a strip shape. The transparent hose is wrapped and covered by the light strip through the plastic extrusion molding technology.

Most products in the market are the hose lights with a single color, and it also exits a few spiral bicolor LED hose lights.

However, the manufacturers need multiple processes to manufacture spiral bicolor LED hose lights in the current technology.

Firstly, the flexible light strip is wrapped and covered a first layer of the hose with a single color by the plastic extrusion molding, and then a second layer of the spiral lines are wrapped and covered on the first layer of the hose with a single color.

It takes two main processes to make the spiral bicolor LED hose light for this kind of technology, therefore it has low production efficiency and the equipment investment costs are high because it needs two injection molding machines.

SUMMARY OF THE INVENTION

The technical problem to be solved by the present invention is to provide an extrusion molding machine for manufacturing the spiral bicolor LED hose light, which will reduce the manufacturing processes of the spiral bicolor LED hose light and greatly increase the production efficiency and save the equipment investment costs.

In order to solve the aforementioned technical problems, the technical solution of the present invention is described as follows.

The extrusion molding machine for manufacturing the spiral bicolor LED hose light disclosed by the present invention includes: a first extruder, a second extruder, an extrusion molding mechanism, and a first power mechanism; wherein the injection molding mechanism includes a fixing mold and a forming mold which are connected serially. The forming mold includes an outer sleeve and a mold core insertedly set inside the outer sleeve, wherein a first flow channel and a second flow channel which are interconnected are respectively set in the central part of the fixing mold and the mold core.

A plurality of third flow channels are set in the upper half of the housing of the mold core and are interconnected with the second flow channel. The transportation end terminal of the first extruder for the molten plastic is sealedly connected with the input terminal of the first flow channel And, the transportation end terminal of the second extruder for the molten plastic is sealedly connected with the sealed input terminal of the third flow channels after passing through an extruder. The periphery of the mold core is fixedly connected with a first transmission gear. The first transmission gear is engagedly connected with the first power mechanism, and a light strip input channel is set in the fixing mold and is interconnected with the first flow channel and the second flow channel.

Furthermore, the input channel terminal of the second flow channel is gradually smaller by funneling the shape, it is orderly connected with a first horizontal channel with a section of equal diameter. And, the transportation end terminal of the first horizontal channel is gradually larger by funneling the shape and connected with a second horizontal channel. The pipe diameter of the second horizontal channel is larger than which of the first horizontal channel, and the third flow channels and the second horizontal channel are interconnected.

Furthermore, the first extruder includes a first feed hopper and a first screw bar assembly sealedly connected with the first feed hopper, and the second extruder includes a second feed hopper and a second screw bar assembly sealedly connected with the second feed hopper. The inside of the first screw bar assembly and the second screw bar assembly are respectively installed a first temperature sensor and a second temperature sensor.

Furthermore, a circularly surrounded cooling slot is set on the housing surface of the outer sleeve, and a cooling hose assembly is set at the adjacent position of the outer sleeve; wherein the cooling hose assembly includes a frame and a cooling hose set on the frame. A nozzle is set at the output terminal of the cooling hose to spray cooling water to the cooling slot, and a cooling fan is set in the side-part of the output terminal of the injection molding mechanism.

Furthermore, a cooling water slot assembly for cooling the finished product of the hose light is set at the corresponding location of the exit of the extrusion molding mechanism, and the cooling water slot assembly includes a cooling water slot, a cooling water nozzle set at one-side of the cooling water slot, and a circulating water pump respectively connected with the cooling water slot.

Furthermore, a mounting bracket is set on the top of the fixing mold for the fine adjustment of the height, which the mounting bracket is connected with a hydraulic device.

Furthermore, the first power mechanism includes a first motor and a drive chain engagedly connected with the power output terminal of the first motor, wherein a second transmission gear assembly is engagedly connected with another end of the drive chain and the second transmission gear assembly and the first transmission gear are engagedly connected.

Furthermore, both of the first extruder and the second extruder are extruder with single screw bar.

Adopting the above technical solutions, the first extruder and the second extruder respectively squeeze in molten plastic with different color. The light strip input channel of the fixing mold inputs the LED light strip to pass through the first flow channel and the second flow channel, and the transparent molten plastic squeezed by the first extruder wraps and covers the LED light strip, and, and the second extruder squeezes in the molten plastic with other color. Because the mold core has the first power mechanism to drive to rotate, the molten plastic squeezed by the second extruder will be spirally wounded on the surface of the transparent molten plastic.

This machine according to the present invention realizes the manufacturing of the spiral bicolor LED hose light by extrusion molding which just needs a single process and a single equipment, such that it greatly increases the production efficiency and saves the equipment investment costs.

DETAILED DESCRIPTION OF THE PREFERRED EMBODIMENTS

The following descriptions are exemplary embodiments only, and are not intended to limit the scope, applicability or configuration of the invention in any way. Rather, the following detailed description provides a convenient illustration for implementing exemplary embodiments of the invention. Various changes to the described embodiments may be made in the function and arrangement of the elements described without departing from the scope of the invention as set forth in the appended claims.

Figure 1:
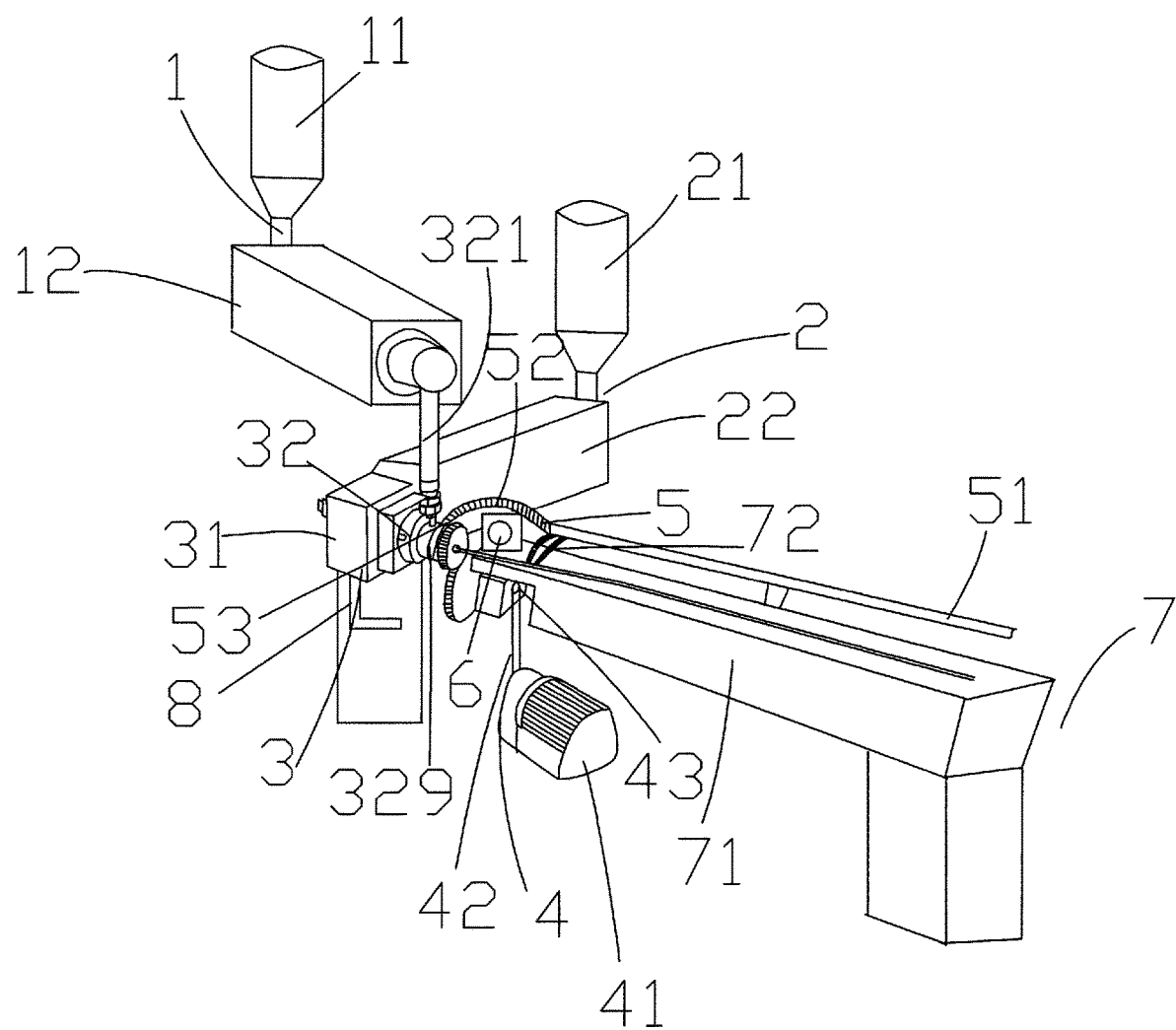
FIG. 1 is a structure schematic diagram of the extrusion molding machine for manufacturing the spiral bicolor LED hose light according to the present invention.
Figure 2:
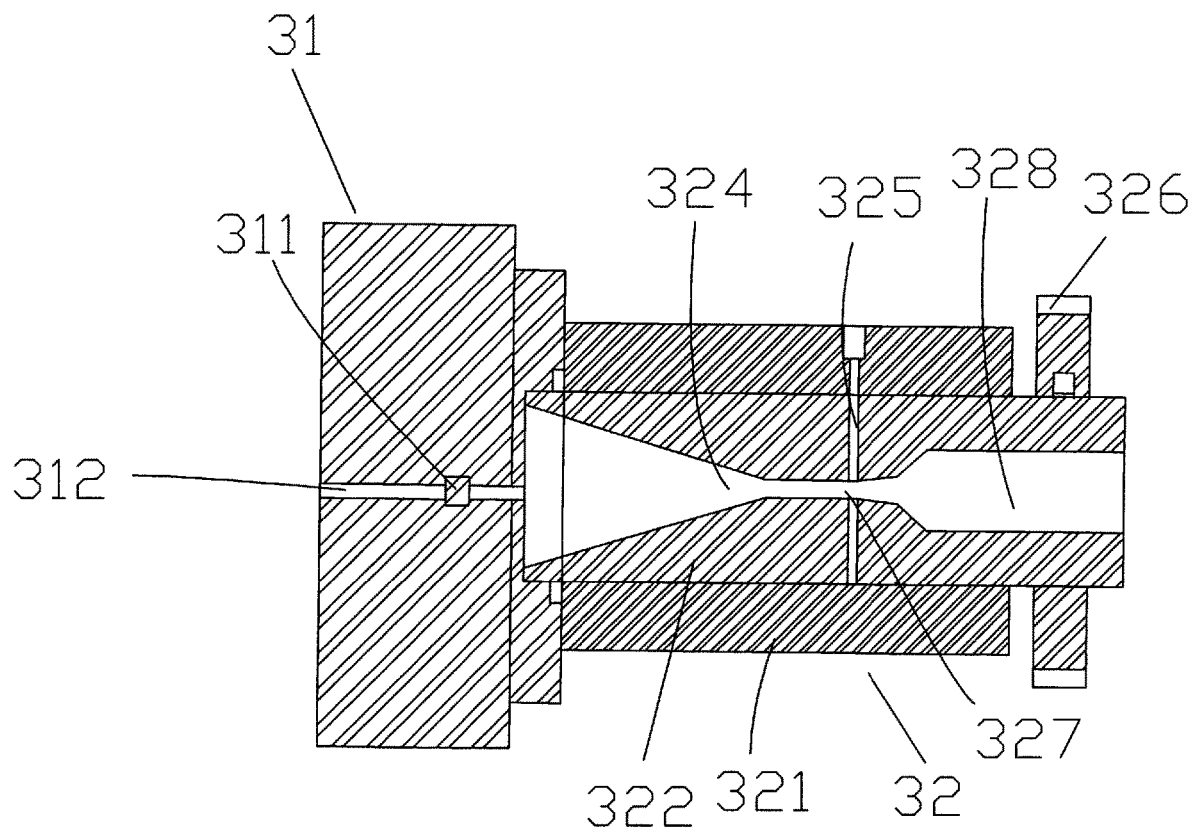
FIG. 2 is a sectional longitudinal view of the extrusion molding machine according to the present invention.

As shown in FIG. 1 and FIG. 2, the extrusion molding machine for manufacturing the spiral bicolor LED hose light disclosed by the present invention includes: a first extruder 1, a second extruder 2, an extrusion molding mechanism 3, and a first power mechanism 4; wherein the extrusion molding mechanism 3 includes a fixing mold 31 and a forming mold 32 which are connected serially. The forming mold 32 includes an outer sleeve 321 and a mold core 322 insertedly set inside the outer sleeve 321, wherein a first flow channel 311 and a second flow channel 324 which are interconnected are respectively set in the central part of the fixing mold 31 and the mold core 322. A plurality of third flow channels 325 are set in the upper half of the housing of the mold core 322 and are interconnected with the second flow channel 324. The transportation end terminal of the first extruder 1 for the molten plastic is sealedly connected with the input terminal of the first flow channel 311. And, the transportation end terminal of the second extruder 2 for the molten plastic is sealedly connected with the sealed input terminal of the third flow channels 325 after passing through an extruder. The periphery of the mold core 322 is fixedly connected with a first transmission gear 326. The first transmission gear 326 is engagedly connected with the first power mechanism 4, and a light strip input channel 312 is set in the fixing mold 31 and is interconnected with the first flow channel 311 and the second flow channel 324.

The first extruder 1 and the second extruder 2 respectively squeeze in molten plastic with different colors, and the light strip input channel 312 on the fixing mold 31 inputs the LED light strip to pass through the first flow channel 311 and the second flow channel 324. The transparent molten plastic squeezed by the first extruder 1 wraps and covers the LED light strip, and the second extruder 2 squeezes in the molten plastic with other color. Because the mold core 322 has the first power mechanism 4 to drive to rotate, the molten plastic squeezed by the second extruder 2 will be spirally wounded on the surface of the transparent molten plastic.

This machine according to the present invention realizes the manufacturing of the spiral bicolor LED hose light by extrusion molding which just needs a single process and a single equipment, such that it greatly increases the production efficiency and saves the equipment investment costs.

The input channel terminal of the second flow channel 324 according to this embodiment is gradually smaller by funneling the shape, it is orderly connected with a first horizontal channel 327 with a section of equal diameter. And, the transportation end terminal of the first horizontal channel 327 is gradually larger by funneling the shape and connected with a second horizontal channel 328. The pipe diameter of the second horizontal channel 328 is larger than which of the first horizontal channel 327. The first flow channel 311 and the second horizontal channel 328 are interconnected, so the molten plastic will be narrower gradually when passing through the first horizontal channel 327, and then will be pass through the second horizontal channel 328 which is gradually larger. The molten plastic with the other color flown from the third flow channels 325 will wrap and cover on the surface of the first layer of plastic. The molding effect is better for the molten plastic in the gradually narrower space, and the shape of the LED light strip is more round.

The first extruder 1 includes a first feed hopper 11 and a first screw bar assembly 12 sealedly connected with the first feed hopper 11, and the second extruder 2 includes a second feed hopper 21 and a second screw bar assembly 22 sealedly connected with the second feed hopper 21. The inside of the first screw bar assembly 12 and the second screw bar assembly 22 are respectively installed a first temperature sensor and a second temperature sensor.

The installation of the temperature sensors is beneficial to monitor the real-time working conditions of the high-temperature control components, which can adjust the measures to cool down at any time if the temperature is too high.

A circularly surrounded cooling slot 329 is set on the housing surface of the outer sleeve 321, and a cooling hose assembly 5 is set at the adjacent position of the outer sleeve 321; wherein the cooling hose assembly 5 includes a frame 51 and a cooling hose 52 set on the frame 51. A nozzle 53 is set at the output terminal of the cooling hose 52 to spray cooling water to the cooling slot 329, and a cooling fan 6 is set in the side-part of the output terminal of the injection molding mechanism 3. The air-cooled and water-cooled combination greatly enhances the cooling effect for the extrusion molding mechanism 3.

A cooling water slot assembly 7 for cooling the finished product of the hose light is set at the corresponding location of the exit of the extrusion molding mechanism 3, and the cooling water slot assembly 7 includes a cooling water slot 71, a cooling water nozzle 72 set at one-side of the cooling water slot 71, and a circulating water pump respectively connected with the cooling water slot 71.

While circulating the water to the finished product for cooling, it can simultaneously save the heat-cooling water and reduce the manufacturing cost.

A mounting bracket 8 is set on the top of the fixing mold 31 for the fine adjustment of the height, which the mounting bracket 8 is connected with a hydraulic device to proceed the fine adjustment for the fixing mold 31.

The first power mechanism 4 includes a first motor 41 and a drive chain 42 engagedly connected with the power output terminal of the first motor 41, wherein a second transmission gear assembly 43 is engagedly connected with another end of the drive chain 42. Because the second transmission gear assembly 43 and the first transmission gear 326 are engagedly connected, the first power mechanism 4 is simple and easy to implement and helps to reduce the overall cost of this equipment.

And, it can effectively reduce the machine's manufacturing difficulty because both of the first extruder 1 and the second extruder 2 are extruder with single screw bar which has simple structure.

The working principle of the extrusion molding machine according to the present invention is described in the following. The molten plastic of two different colors respectively pass through the hoppers of the first extruder 1 and the second extruder 2, and then be extruded and transported to the extrusion molding mechanism 3. The light strip input channel 312 of the fixing mold 31 inputs the LED light strip to pass through the first flow channel 311 and the second flow channel 324, wherein the molten plastic will be narrower gradually when passing through the first horizontal channel 327, then, the molten plastic will pass through the second horizontal channel 328 which is gradually larger. The molten plastic with the other color flown from the third flow channels 325 will wrap and cover on the surface of the first layer of plastic. Because the mold core 322 has the first power mechanism 4 to drive to rotate, the molten plastic squeezed by the second extruder 2 will be spirally wounded on the surface of the transparent molten plastic.

I claim:

1. An extrusion molding machine for manufacturing spiral bicolor LED hose light, which is characterized in that: it comprises a first extruder, a second extruder, an extrusion molding mechanism, and a first power mechanism;

wherein the extrusion molding mechanism comprises a fixing mold and a forming mold which are connected serially;

wherein the forming mold comprises an outer sleeve and a mold core insertedly set inside the outer sleeve;

wherein a first flow channel and a second flow channel which are interconnected are respectively set in the central part of the fixing mold and the mold core;

wherein a plurality of third flow channels are set in an upper half of the housing of the mold core and are interconnected with the second flow channel;

wherein the transportation end terminal of the first extruder for the molten plastic is sealedly connected with an input terminal of the first flow channel; and a transportation end terminal of the second extruder for molten plastic is sealedly connected with a sealed input terminal of the third flow channels;

wherein a periphery of the mold core is fixedly connected with a first transmission gear;

wherein the first transmission gear is engagedly connected with the first power mechanism, and a light strip input channel is set in the fixing mold and is interconnected with the first flow channel and the second flow channel;

wherein the input channel terminal of the second flow channel is gradually smaller by funneling the shape, it is orderly connected with a first horizontal channel with a section of equal diameter; and the transportation end terminal of the first horizontal channel is gradually larger by funneling the shape and connected with a second horizontal channel.

2. The extrusion molding machine for manufacturing the spiral bicolor LED hose light according to claim 1, which is characterized in that: the first extruder comprises a first feed hopper and a first screw bar assembly sealedly connected with the first feed hopper, and the second extruder comprises a second feed hopper and a second screw bar assembly sealedly connected with the second feed hopper; wherein the inside of the first screw bar assembly and the second screw bar assembly are respectively installed a first temperature sensor and a second temperature sensor.

3. The extrusion molding machine for manufacturing the spiral bicolor LED hose light according to claim 1, which is characterized in that: a circularly surrounded cooling slot is set on the housing surface of the outer sleeve, and a cooling hose assembly is set at the adjacent position of the outer sleeve; wherein the cooling hose assembly comprises a frame and a cooling hose set on the frame; and a nozzle is set at an output terminal of the cooling hose to spray cooling water to the cooling slot, and a cooling fan is set in the side-part of the output terminal of the extrusion molding mechanism.

4. The extrusion molding machine for manufacturing the spiral bicolor LED hose light according to claim 1, which is characterized in that: a cooling water slot assembly for cooling the finished product of the hose light is set at the corresponding location of the exit of the extrusion molding mechanism; wherein the cooling water slot assembly comprises a cooling water slot, a cooling water nozzle set at one-side of the cooling water slot, and a circulating water pump respectively connected with the cooling water slot.

5. The extrusion molding machine for manufacturing the spiral bicolor LED hose light according to claim 1, which is characterized in that: the first power mechanism comprises a first motor and a drive chain engagedly connected with a power output terminal of the first motor; wherein a second transmission gear assembly is engagedly connected with another end of the drive chain, and the second transmission gear assembly and the first transmission gear are engagedly connected.

6. The extrusion molding machine for manufacturing the spiral bicolor LED hose light according to claim 1, which is characterized in that: both of the first extruder and the second extruder are extruders with a single screw bar.

* * * * *